United States Patent
Groteke

[19]
[11] Patent Number: 6,136,262
[45] Date of Patent: Oct. 24, 2000

[54] DROSS PROCESSING SYSTEM

[75] Inventor: Daniel E. Groteke, St. Joseph, Mich.

[73] Assignee: Q.C. Designs, Inc., St. Joseph, Mich.

[21] Appl. No.: 09/233,564

[22] Filed: Jan. 19, 1999

[51] Int. Cl.[7] .................................................. C22B 7/04
[52] U.S. Cl. .......................... 266/165; 266/227; 266/275
[58] Field of Search .................................. 266/227, 165, 266/275; 75/672

[56] References Cited

U.S. PATENT DOCUMENTS

| | | | |
|---|---|---|---|
| 862,008 | 7/1907 | Nebel | 266/232 |
| 2,754,199 | 7/1956 | Stroup et al. | 75/672 |
| 3,198,505 | 8/1965 | Amdur et al. | 266/37 |
| 3,517,918 | 6/1970 | Cenkner | 266/37 |
| 3,689,049 | 9/1972 | Brumagin et al. | 266/37 |
| 3,999,980 | 12/1976 | Montagna | 75/68 R |
| 4,121,810 | 10/1978 | Lui et al. | 266/201 |
| 4,386,956 | 6/1983 | Roth et al. | 75/24 |
| 4,938,457 | 7/1990 | Singleton, Jr. | 266/204 |
| 5,470,376 | 11/1995 | Dube et al. | 75/672 |
| 5,997,802 | 12/1999 | Holcombe, Jr. et al. | 266/275 |

FOREIGN PATENT DOCUMENTS

| | | | |
|---|---|---|---|
| 51-66213 | 6/1976 | Japan | 75/672 |

*Primary Examiner*—Melvyn Andrews
*Attorney, Agent, or Firm*—Michael J. Weins; Jeffrey E. Semprebon

[57] ABSTRACT

A portable dross processing system has a support frame with a base and an upper support. A pair of wheels are mounted to the base, and a steering wheel can be pivotably mounted to the base. A dross receiving crucible is mounted in a crucible frame which is pivotably mounted to the upper support. The crucible has a sidewall and a bottom having a port. The crucible may be formed from a mounting rim of steel plate to which a metal mesh reservoir form is attached. The mesh is then covered with moldable refractory cloth, over which a ceramic wash is applied. A finishing wash is applied to the crucible interior. Preheated dross is loaded into the crucible while in a dross loading position. The dross is preferably mixed with an exothermic compound and stirred to promote coalescence of the entrapped metal. After the molten metal forms a pool in the bottom of the crucible, the port is opened to drain the metal. The port can be opened by a closure plate slidably engaging a pair of channels and supporting a port plug. A metal collection pan below the crucible accepts the metal. A handle affixed to the support frame aids in maneuvering the system. The crucible is pivoted to a spent dross removal position to deposit the spent dross into a container such as a drum.

16 Claims, 5 Drawing Sheets

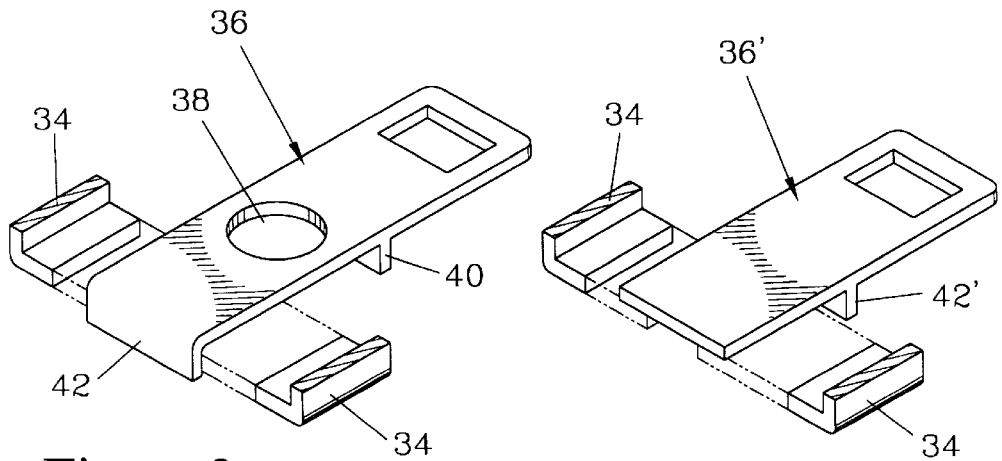
Figure 3
Figure 4
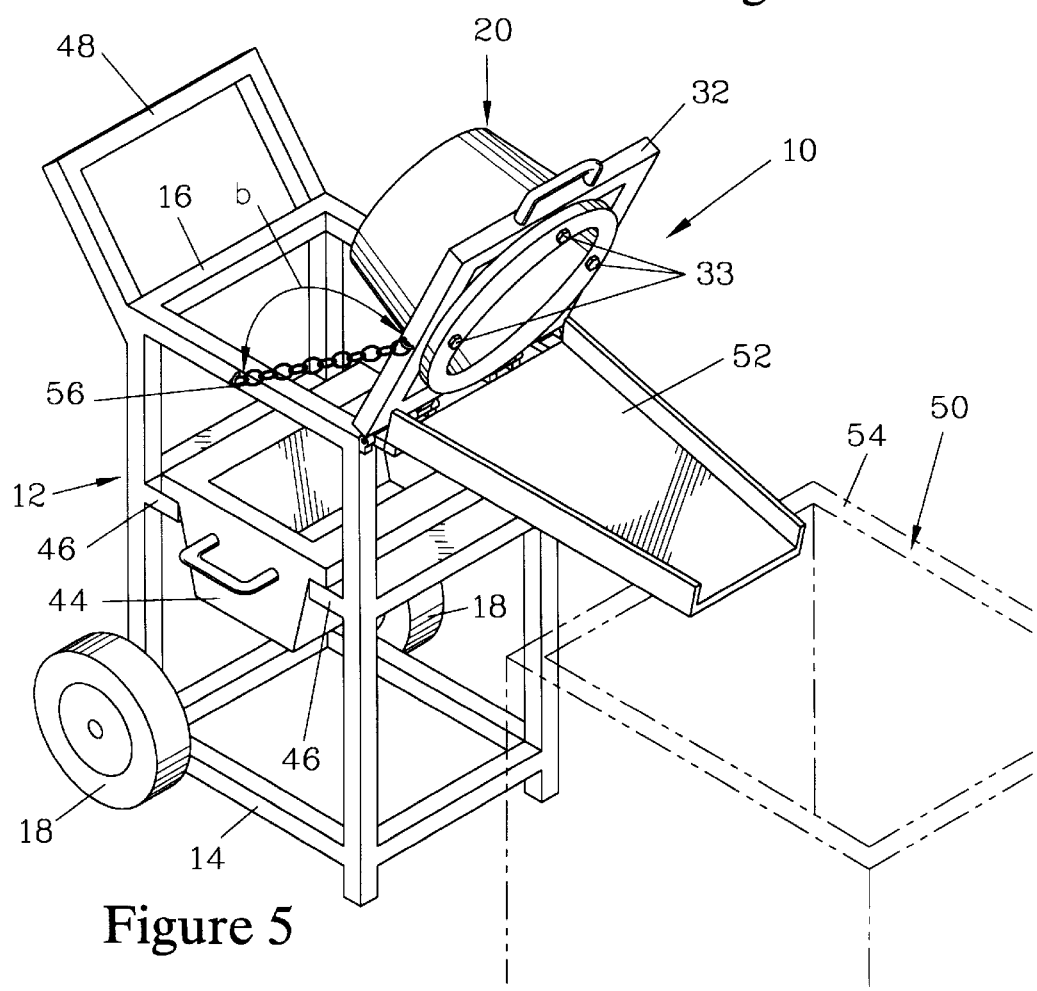
Figure 5

DROSS PROCESSING SYSTEM

FIELD OF THE INVENTION

The present invention relates to a dross processing system and a method for operating the same. More particularly, the present invention relates to a method for processing dross and to a portable dross processing system designed to be used on a foundry floor to process in situ the dross generated by a melting furnace, and having particular utility for processing dross from aluminum melting.

BACKGROUND OF THE INVENTION

There a variety of techniques which have been employed to process the dross generated when melting metal in foundries. These dross processing systems are designed to separate metal from the dross, which is a mixture of metal, oxides, and other inclusions. Many of these techniques were developed to treat the dross at a site remote from the furnace. The systems have been designed to process large volumes of dross and have employed large and complex machinery, including mixing and pressing equipment to process the dross. Typical examples of such systems are disclosed in U.S. Pat. Nos. 3,198,505; 4,386,956; and 4,938,457.

In these systems, the metal which is present in the dross is separated by various techniques, depending on the system. In some instances, the metal is separated by pressing the liquid metal out of the oxide in which it was entrapped, while in other systems the metal is recovered by mechanically stirring the dross to promote coalescence of the metal, or by spinning the mixture to separate the metal by centrifugal force. Fluxes are also frequently employed to enhance the coalescence of the metal dispersed in the dross.

Simpler systems which depend solely on gravity for separation of the metal from the oxides have been developed, with metal holding pots which have a large thermal mass to assure that high temperatures can be maintained to maintain the entrapped metal in a molten state (see, for example, U.S. Pat. No. 862,008). These systems frequently employ metal vessels which have a large thermal mass and, when preheated, provide a soaking vessel which allows sufficient time for the metal entrapped in the dross to percolate therethrough. These vessels are generally massive, difficult to transport to the furnace conveniently, or present difficulty in removing the material contained therein.

Thus, there is a need for a simple portable self-contained system which can effectively reclaim the entrapped metal in the dross formed during melting of metals.

OBJECTS OF THE INVENTION

It is an object of the invention to provide a portable dross processing system.

It is another object of the invention to provide a dross processing system which can process the dross at the furnace site.

It is still another object of the invention to provide a portable dross processing system which can sequentially process the dross from multiple furnaces while storing the spent dross for subsequent disposal.

It is yet another object of the invention to provide a dross processing system with a small footprint.

It is yet another object of the invention to provide a dross processing system which is mechanically simple and does not require a power supply.

It is another object of the invention to provide a dross processing system which is inexpensive to fabricate, operate, and maintain.

It is another object of the invention to provide a self-contained dross processing system.

It is still a further object of the invention provide a method for treating dross at the furnace site.

It is still another object of the invention to provide a method for sequentially processing the dross from multiple furnaces while storing the spent dross for subsequent disposal.

It is another object of the invention to provide a method for processing dross which is simple and inexpensive.

It is another object of the invention to provide a method for processing dross as it is skimmed from the melt.

SUMMARY OF THE INVENTION

The present invention provides a portable dross processing system which can be moved from furnace to furnace to collect and process the dross at a furnace site and reclaim entrapped metal contained in the dross.

In an elementary form, the system of the present invention has a support frame with a base and an upper support which is spaced apart from the base. A pair of wheels are rotatably mounted with respect to the support frame and are located in the vicinity of the base to allow the support frame to be freely moved from furnace location to furnace location. In one preferred embodiment, the pair of wheels are mounted on a paired wheel axis which passes through the base, and a steering wheel is pivotably mounted with respect to the paired wheel axis and spaced apart therefrom.

A dross receiving crucible is provided, which terminates in an upper region having a substantially vertical sidewall. The dross receiving crucible has a lower region with a bottom having a crucible port therein. The bottom is preferably graded.

In a preferred embodiment, the dross receiving crucible has a skeletal structure with a mounting rim fabricated from a metal plate and a metal mesh framework attached to the mounting rim to form a reservoir of the crucible. The metal mesh can be formed from an expanded metal sheet which is contoured to serve as the framework for the reservoir. The metal mesh provides a structure which can be readily engaged by moldable refractory cloth overlaid thereon and affixed thereto. A ceramic wash is then applied and, thereafter, a wash such as a boron nitride bearing wash is preferably added to the interior surfaces of the resulting dross receiving crucible to reduce sticking of the dross to the crucible. The dross receiving crucible serves as a holding and processing vessel for dross skimmed from a furnace.

The dross receiving crucible is mounted in a crucible frame which is pivotably mounted with respect to the upper support and rotates from a dross loading position, where the graded bottom of the crucible is substantially horizontal, to a spent dross removal position, where the sidewall of the crucible is inclined with respect to the horizontal. It is further preferred that the rotation angle be between about 110° and 160°.

To reduce the metal-bearing dross to a molten metal pool and a spent dross (having a reduced metal content), the dross is preferably preheated while still in the furnace by the addition of an exothermic compound to the dross. After the exothermic compound is added, the preheated dross is ladled into the dross receiving crucible while it is in the dross loading position.

In reverberatory furnaces, the volume of dross is frequently higher and the dross can be transferred with reduced chilling since it is removed as a unit and with minimal contact with foreign objects. In such cases, no preheating is needed.

The dross which has been loaded into the dross receiving crucible is then mixed with an exothermic compound as needed, and preferably mixed with an exothermic flux which, in addition to raising the temperature of the dross, promotes coalescence of the liquid metal dispersed through the dross. Mixing the dross with the exothermic flux is preferably promoted by manually stirring the exothermic flux into the dross.

It is further preferred to employ a reducing flux with the exothermic flux, adding both to the dross in the dross receiving crucible. The reducing flux aids in the break-down of the oxide coating on the metal droplets and promotes coalescence of the droplets. Preferably, these fluxes have fluoride compounds therein, and it is felt that silica fluorides, calcium fluorides, and sodium fluorides are particularly effective.

The mixing, whether with or without reducing fluxes, tends to promote coalescence of the entrapped metal and formation of a molten pool of metal in the lower region of the crucible as the entrapped metal percolates through the dross, providing a granular spent dross and molten metal. The metal is somewhat cleansed by percolating through the dross, being largely free of oxides. The pooled metal also forms an insulating layer which helps protect the bottom of the crucible from attack by the exothermic flux and the dross.

Means for opening and closing the port in the bottom of the crucible are provided to allow the removal of the molten metal pool which accumulates. In one preferred embodiment, the means for opening and closing the port have a pair of support channels which are embedded in the crucible and which serve as a track. When the dross reducing crucible has a skeletal structure formed in part with an expanded metal sheet, the support channels can be welded to the expanded metal prior to the application of the refractory materials.

A closure plate is provided which slidably engages the track. A port plug is provided, which is configured to slidably engage the port and which is supported on the closure plate. The port plug is a disposable plug and can be fabricated from a refractory paper or bulk fibers. Refractory papers, such as Fiberfrax® paper, and fibers marketed by The Carborundum Company are examples of materials which are well suited for use as the port plug. When the closure plate is in a port-closed position, it is positioned to support the port plug to maintain it in place in the crucible port. The closure plate may be either slid to a port-open position or withdrawn from the pair of channels to remove support for the port plug, allowing the port plug to fall from the crucible port.

Preferably, the dross processing system is provided with a metal collection pan which is positioned below the crucible to accept the molten metal when the port is open. It is further preferred that the metal collection pan slidably engage the remaining structure of the dross processing system so that it can be readily removed for removal of the collected metal.

The dross processing system preferably is provided with a handle which is affixed with respect to the support frame. The handle provides a convenient grip for the user to aid in maneuvering the dross processing system when a pair of wheels are employed. For the two-wheel system, the handle serves to tilt the support frame to facilitate transporting the dross processing system from one furnace site to another. In such cases, the handle is preferably offset with respect to the support frame to increase the leverage available to the user.

When the system has a steering wheel, the handle allows the user the ability to apply a torque to the support frame to cause the steering wheel to turn, thereby redirecting the support frame.

The dross processing system of the present invention preferably deposits the spent dross into a spent dross container such as a drum, which is appropriately positioned to receive the dross from the crucible when the crucible is in the dross removal position. In an elementary form, the support frame is unattached to the spent dross container.

In one preferred embodiment, which employs a conventional spent dross container, a chute is mounted to the support frame. The chute may be placed over a rim of the spent dross container to guide the spent dross dumped from the crucible into the spent dross container.

To further simplify the operation of the dross processing system, it is preferred for the spent dross container to be a standard waste receptacle such as a spent dross drum which attaches to and is supported by the dross processing system, engaging the frame. Having a spent dross drum attached to the system allows the system to be moved directly from location to location without the need to remove the spent dross from the system. While it is preferred to have the spent dross drum attached to the system, it is preferred that it be removable to simplify emptying and/or replacing the spent dross drum.

When the drum is to be attached to the system, a protrusion is preferably provided on the base to support the drum. This protrusion can be either a platform on which the drum rests or forks attached to the base on which the drum rests. The means for maintaining the drum engaged with the support frame are preferably provided by straps, chains, or locking mechanisms which hold the drum to the support frame.

Alternatively, when the dross processing system is configured such that the dross receiving crucible is beside the support frame in the dross loading position, then the drum can be stored within the support frame, in which case the drum can be supported on the base. The base preferably includes a protrusion for the support of the drum, which again can be either a platform or a pair of forks. Again, it is preferred to include means for maintaining the drum engaged with the support frame.

When the dross is being stored in a spent dross drum having a length L, the upper support and the base are sufficiently spaced apart to accommodate the drum length L.

A three-wheeled embodiment has particular benefits in that it is highly mobile while having the capacity to bear a heavily loaded drum. In this embodiment, the base and the protrusion attached thereto are an integrated structure forming a load platform. When such a structure is employed, it is preferred to have the axis of the paired wheels reside under the rest position of the drum on the platform, while the steering wheel is positioned at a distance from the rest position of the drum. The handle associated with the support frame is preferably located substantially above the steering wheel.

It is preferred for the load platform to include a storage shelf for supporting a container of flux compound. The storage shelf allows the container of flux compound to conveniently be carried along to and from the furnace site.

BRIEF DESCRIPTION OF THE FIGURES

FIG. 3 is an exploded isometric view of the closure plate employing stops and the support channels shown in FIG. 2.

FIG. 4 is an exploded isometric view illustrating an alternative closure plate which can be used in place of the closure plate illustrated in FIG. 3.

FIG. 5 illustrates the embodiment of FIG. 1 when the crucible is in a spent dross removal position and the chute is positioned over a rim of the spent dross container. The crucible is inclined to allow the spent dross to fall onto the chute, which directs the spent dross into the spent dross container.

BEST MODE OF CARRYING THE INVENTION INTO PRACTICE

Figure 1:
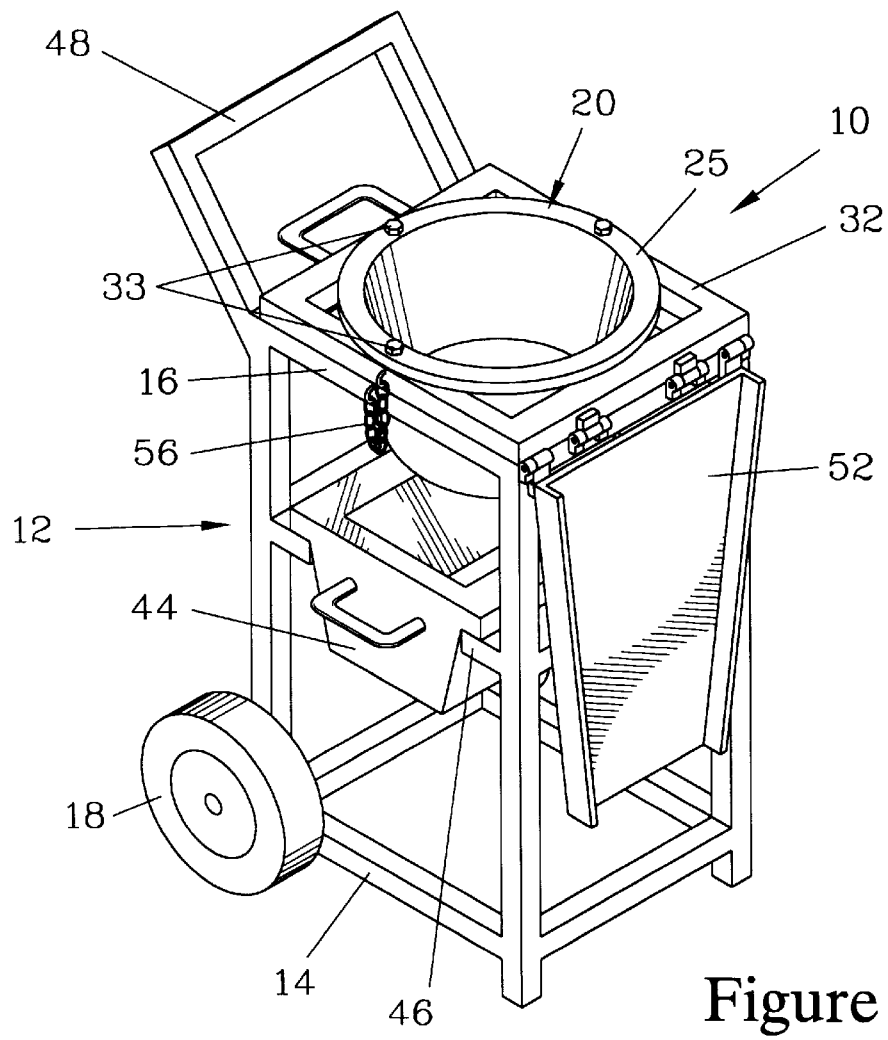
FIG. 1 illustrates one embodiment of a dross processing system of the present invention. The dross processing system of this embodiment has a support frame to which a chute is pivotably mounted, and is designed for use with a conventional spent dross container. The dross processing system is illustrated in a dross loading position, where a dross receiving crucible rests on the support frame and the chute is positioned against the support frame.

FIGS. 1 through 5 illustrate a dross processing system 10 which forms one embodiment of the present invention. The dross processing system 10 has a support frame 12 having a base 14 and an upper support 16 which is spaced apart from the base 14. A pair of wheels 18 are rotatably mounted to the support frame 12 in the vicinity of the base 14 to facilitate transporting the dross processing system 10 to a furnace site (not shown).

Figure 2:
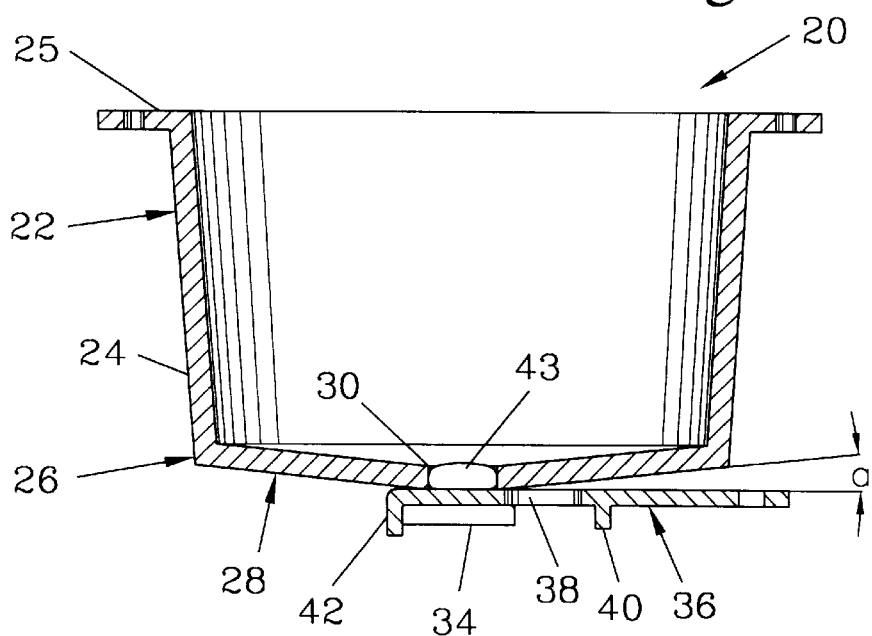
FIG. 2 is a cross section of the crucible shown in FIG. 1. In this embodiment, a closure plate which slidably engages support channels attached to the crucible allows opening and closing a port in a bottom wall of the crucible. A port plug in the port seals the port when it is closed.

A dross-receiving crucible 20 is provided, which is better shown in the section view of FIG. 2. The crucible 20 has an upper region 22 with a preferably substantially vertical sidewall 24. The upper region 22 terminates in a mounting rim 25. The substantially vertical sidewall 24 may be angled slightly, particularly when the crucible 20 is fabricated by molding. The crucible 20 also has a lower region 26 terminating in a graded bottom wall 28. The bottom wall 28 has a grade of α which is preferably between about 10° and 20°. A grade helps facilitate outflow of metal from the crucible 20. However, a steep grade would tend to minimize area of the bottom wall 28 covered by molten metal, allowing greater contact of the reacting dross with the bottom wall 28 and promoting degradation of the crucible 20. The bottom wall 28 is provided with a crucible port 30.

Referring again to FIG. 1, the crucible 20 is mounted to a crucible frame 32 which is pivotably mounted to the upper support 16. The crucible 20 is preferably attached to the crucible frame 32 by bolts 33 which pass through both the mounting rim 25 and the crucible frame 32, and which are secured by nuts (not shown). The pivotable mounting of the crucible frame 32 to the upper support 16 allows pivoting of the crucible 20 between a dross loading position (shown in FIG. 1) and a spent dross removal position (shown in FIG. 5).

Means 33 for opening and closing the crucible port 30 are provided. In the dross processing system 10, the means 33 for opening and closing the crucible port 30 include a pair of L-shaped channels 34 (better shown in FIG. 3) which are affixed to the lower region 26 of the crucible 20. The L-shaped channels 34 are positioned parallel to each other on opposite sides of the crucible port 30. A closure plate 36, having an aperture 38, slidably engages the pair of L-shaped channels 34 so as to be slidable between a port closed position, where the closure plate 36 blocks the crucible port 30, and a port open position, where the aperture 38 is substantially aligned with the crucible port 30. The pair of L-shaped channels 34 and the closure plate 36 may be constructed from 15–20 gauge steel stock. When the aperture 38 is employed, a port open stop 40 is preferably provided on the closure plate 36, which engages the pair of L-shaped channels 34 when the closure plate 36 is in the port open position. Similarly, a port closed stop 42 is preferably provided, which engages the pair of L-shaped channels 34 when the closure plate 36 is in the port closed position.

An alternative embodiment of the means 33' for opening and closing the crucible port 30 is illustrated in FIG. 4. In this embodiment, the means 33' includes a closure plate 36' which slidably engages the L-shaped channels 34. The closure plate 36' is engaged with the L-shaped channels 34 in a port closed position, where the closure plate 36' blocks the crucible port 30, and is withdrawn from engagement with the L-shaped channels 34 when it is desired to open the crucible port 30. Removal of the closure plate 36' prevents metal from becoming trapped between the closure plate 36' and the crucible 20 and restricting movement of the closure plate 36'. In this embodiment, no stops are required, but a port closed stop 42' is preferably provided to engage the pair of L-shaped channels 34 when the closure plate 36' is in the port closed position, fully blocking the crucible port 30.

When the closure plate 36 is in its port closed position, it supports a plug 43 positioned in the crucible port 30 (shown in FIG. 2). The plug 43 is constructed of a refractory material such as refractory paper or fiber, and is placed in the crucible port 30 while the closure plate 36 is in its closed position to form a temporary seal. Refractory materials such as Fiberfrax® papers and refractory fibers marketed by The Carborundum Company are examples of materials which have been found suitable for constructing the plug 43. When the closure plate 36 is slid to its open position, the aperture 38 is substantially aligned with the crucible port 30, leaving the plug 43 unsupported. Depending on the depth of the metal above the plug 43, the plug 43 may be washed out of the crucible port 30 by the metal. Alternatively, a rod (not shown) may be employed to knock the plug 43 out of the crucible port 30 from above to drain the metal.

The dross processing system 10 includes a metal collection pan 44. The metal collection pan 44 is positioned relative to the crucible frame 32 such that metal passing through the crucible port 30 drains into the metal collection pan 44 when the crucible 20 is in the dross loading position. It is further preferred for the metal collection pan 44 to be removably mounted to the support frame 12, facilitating removal of the collected metal. In the dross processing system 10, the metal collection pan 44 slidably engages a pair of shelves 46 affixed to the support frame 12.

To facilitate moving the dross processing system 10, it is preferred for a handle 48 to be provided which is affixed to the support frame 12. It is further preferred for the handle 48 to be offset from the support frame 12 to provide additional leverage for the user.

In the dross processing system 10, spent dross is stored in a spent dross container 50 (shown in FIG. 5). Preferably, a chute 52 is pivotably attached to the support frame 12. When the dross processing system 10 is positioned at the spent dross container 50, the chute 52 may be rested on a rim 54 of the spent dross container 50. The chute 52 is positioned with respect to the support frame 12 such that the spent dross falls onto the chute 52 when the crucible 20 is in the spent dross removal position. The chute 52 then directs the spent dross into the spent dross container 50.

It is further preferred to limit the pivotable motion between the crucible frame 32 and the upper support 16 to provide positive positioning of the crucible 20 in the spent dross removal position. In the dross processing system 10, a chain 56 is provided which limits the pivotable motion of the crucible frame 32 such that, when the crucible 20 is in the spent dross removal position, it is inclined to the horizontal by an angle β between about 110° and 160°, the preferred angle being dependent on the angle of repose of the spent dross material.

Figure 6:
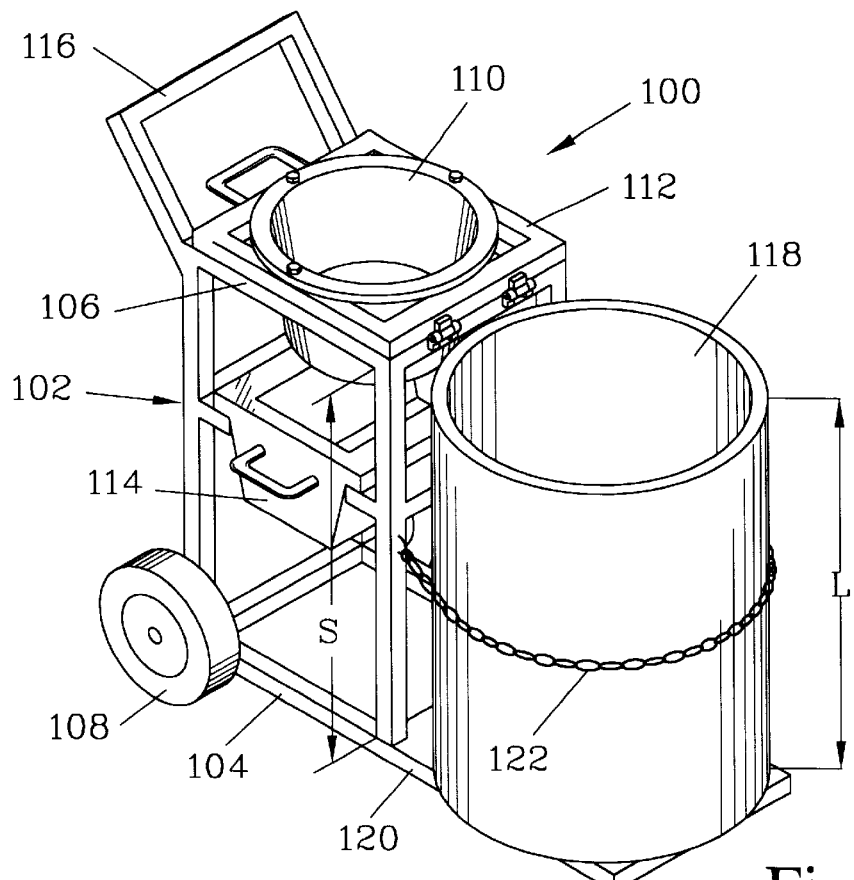
FIG. 6 illustrates another embodiment of a dross processing system of the present invention. This embodiment differs from the embodiment of FIGS. 1 and 5 in that the support frame is provided with a platform which supports a spent dross drum and a chain which maintains the drum on the platform. In this embodiment, the drum serves as a spent dross container. The use of a platform to support the spent dross drum and a chain to maintain the drum in position allows the drum to be moved with the system.

FIG. 6 illustrates a dross processing system 100 which forms another embodiment of the present invention. The dross processing system 100 shares many features in common with the embodiment illustrated in FIGS. 1 and 5, and again has a support frame 102 having a base 104 and an upper support 106. A pair of wheels 108 (only one of which is apparent) are mounted to the support frame 102. A dross-receiving crucible 110 is provided, which is similar to the crucible 20 discussed above and which is mounted to a crucible frame 112 which in turn is pivotably mounted to the upper support 106. In the dross loading position, the crucible 110 resides atop the support frame 102. Preferably, the dross processing system 100 includes a metal collection pan 114 which is positioned to collect metal draining from the crucible 110 and is removably mounted to the support frame 102. Again, a handle 116 is affixed to the support frame 102.

The dross processing system 100 differs from the dross processing system 10 in that it is designed to use a spent dross drum 118 as a spent dross container. The dross processing system 100 is designed such that the spent dross drum 118 is attached to and supported by the dross processing system 100. The support frame 102 is provided with a platform 120 which is attached to the base 104 and serves to support the spent dross drum 118. The platform 120 resides under the spent dross drum 118 and aids moving the spent dross drum 118 with the dross processing system 100 when it is transported from one furnace site to another.

In the dross processing system 100, the spent dross drum 118 has a length L, and the support frame 102 is constructed such that the base 104 and upper support 106 are spaced apart a separation S which is greater than length L. When a standard 55 gallon drum having a length L measuring 35 inches is employed as the spent dross drum 118, a separation S of 36 inches has been found effective. It is generally preferred to keep the separation S at a minimum value to make the dross processing system 100 as compact as possible and to facilitate loading the crucible 110.

When the spent dross drum 118 is attached to the dross processing system 100, means for maintaining the spent dross drum 118 engaged with the support frame 102 are provided. In the dross processing system 100, a chain 122 provides means for maintaining the spent dross drum 118 engaged with the support frame 102. The chain 122 passes around the spent dross drum 118 and attaches to the support frame 102 to maintain the spent dross drum 118 engaged therewith. The platform 120 and chain 122 also provide means for indexing the drum 118 with respect to the support frame 102 such that spent dross falls into the spent dross drum 118 when the crucible 110 is in the spent dross removal position.

Figure 7:
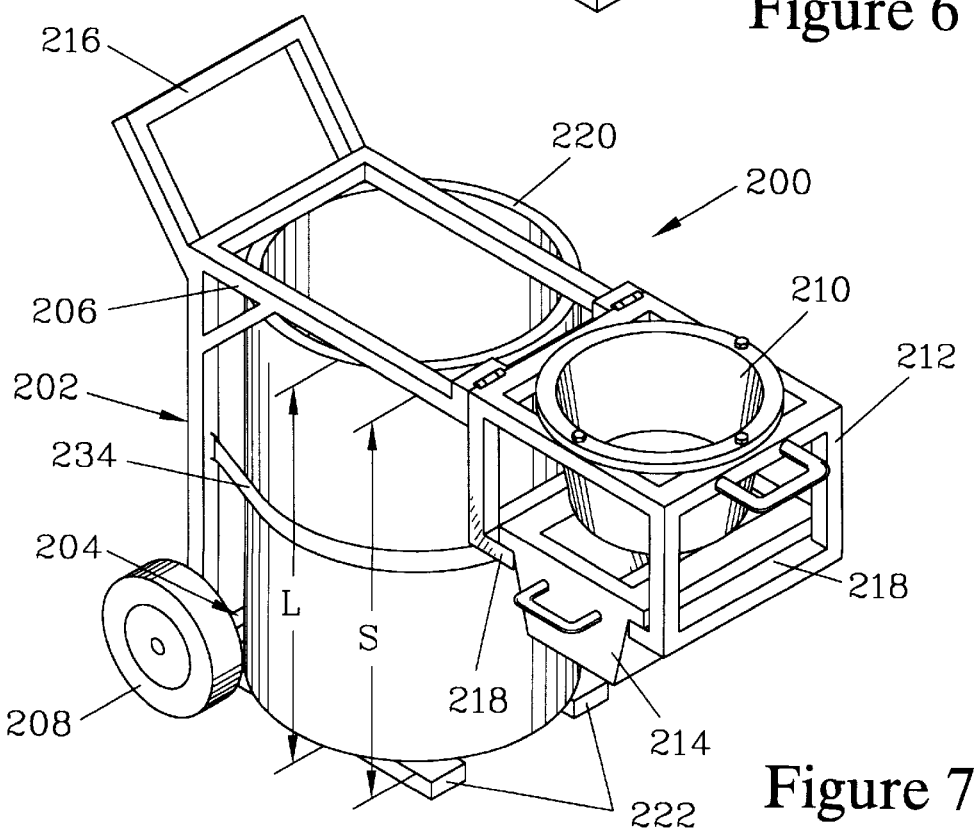
FIG. 7 illustrates another embodiment of the present invention which differs from the embodiment of FIG. 6 in that in this embodiment, the drum resides in the support frame, which provides for more compact storage of the dross processing system. The dross processing system is shown where the crucible is in the dross loading position.
Figure 8:
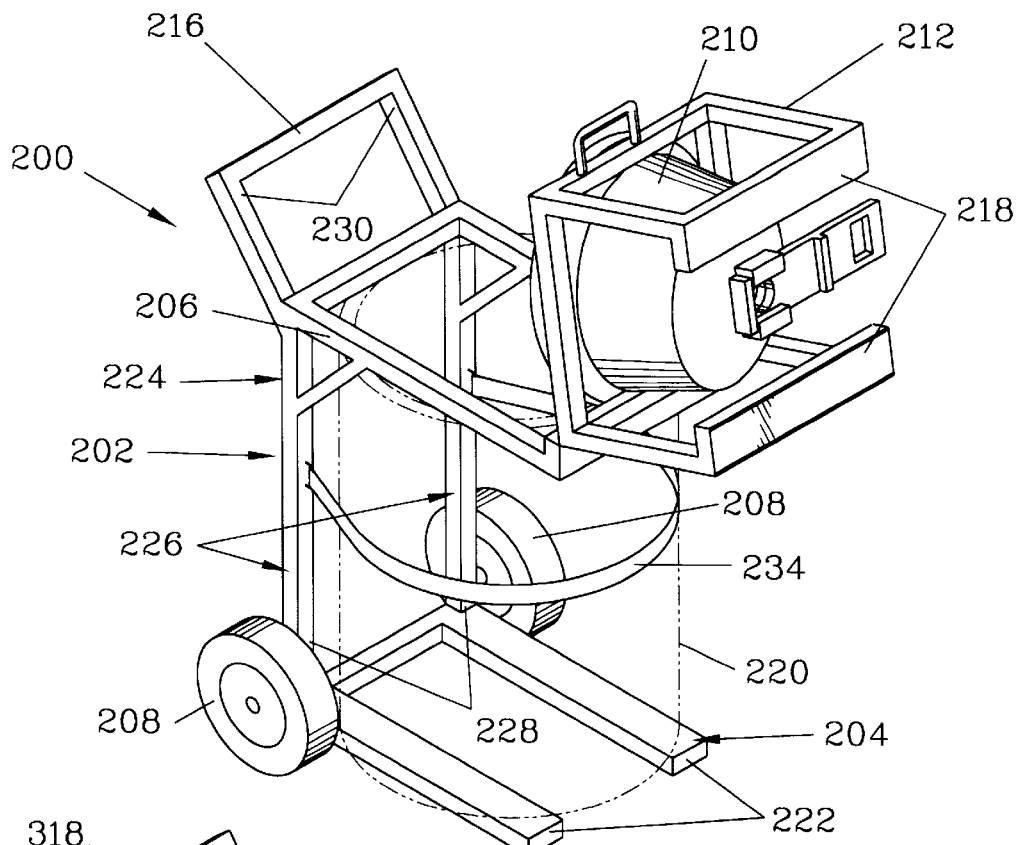
FIG. 8 illustrates the embodiment shown in FIG. 7 where the crucible has been pivoted to a position where spent dross will fall into the drum. The crucible can be further rotated so as to reside above the drum and the support frame, providing a reduced footprint for storage of the dross processing system. The spent dross drum is shown in phantom in FIG. 8 in order to more clearly show the structure of the support frame.

FIGS. 7 and 8 illustrate a dross processing system 200 which forms yet another embodiment of the present invention. The dross processing system 200 shares many features in common with the dross processing system 100 illustrated in FIG. 6. The dross processing system 200 has a support frame 202 having a base 204 and an upper support 206. A pair of wheels 208 are mounted to the support frame 202, and a dross-receiving crucible 210 is mounted to a crucible frame 212 which in turn is pivotably mounted to the upper support 206. A metal collection pan 214 slidably engages the crucible frame 212, and a handle 216 is attached to and offset from the support frame 202 to assist in moving the dross processing system 200.

In the dross processing system 200, the crucible 210 is positioned beside the support frame 202 when the crucible 210 is in the dross loading position, as illustrated in FIG. 7. When the dross processing system 200 is so configured, the metal collection pan 214 is removably mounted to the crucible frame 212. In the dross processing system 200, the metal collection pan 214 slidably engages shelves 218 provided on the crucible frame 212. When the molten metal is drained into the metal collection pan 214, the metal collection pan 214 is removed from the crucible frame 212 prior to pivoting the crucible 210 to the spent dross removal position (shown in FIG. 8) to prevent spillage of the metal collected in the metal collection pan 214.

The dross processing system 200 again employs a spent dross drum 220 which is made an integral part of the dross processing system 200. In the dross processing system 200, the spent dross drum 220 is housed in the support frame 202. The base 204 of the support frame 202 is provided with a pair of forks 222 which reside under and support the spent dross drum 220, allowing it to be moved as an integral part of the dross processing system 200 from one furnace site to another. It should be noted that employing the forks 222 to support the spent dross drum 220 facilitates loading and unloading of the spent dross drum 220.

The particular configuration of the dross processing system 200 is beneficial in that it provides for more compact storage. When the dross receiving crucible 210 and the crucible frame 212 are pivoted beyond the spent dross removal position shown in FIG. 8 to a storage position, the crucible frame 212 resides above the support frame 202, and a reduced footprint results for storage of the dross processing system 200.

An additional benefit of the configuration of the dross processing system 200 is that, because the spent dross drum 220 resides in the support frame 202, it is closer to the wheels 208. This proximity decreases the moment arm of the spent dross drum 220 relative to the wheels 208, facilitating transportation of the dross processing system 200 when the spent dross drum 220 is loaded with spent dross.

In the dross processing system 200, the spent dross drum 220 again has a length L, and the support frame 202 is constructed such that the base 204 and upper support 206 are spaced apart a separation S which is greater than the length L in order to accommodate the spent dross drum 220. In the dross processing system 200, the support frame 202 is formed with a back 224 formed by two spaced-apart rails 226, each of the spaced apart rails 226 having a first end 228 and a second end 230. The first ends 228 of the rails are mounted to the base 204, while the second ends 230 are free standing and support the handle 216. In the dross processing system 200, the upper support 206 and the handle 216 serve as supplemental cross supports to stabilize the spaced apart rails 226.

In this embodiment, means for maintaining the spent dross drum 220 engaged with the support frame 202 are provided by a strap 234 which passes around the spent dross drum 220 and attaches to the support frame 202.

Figure 9:
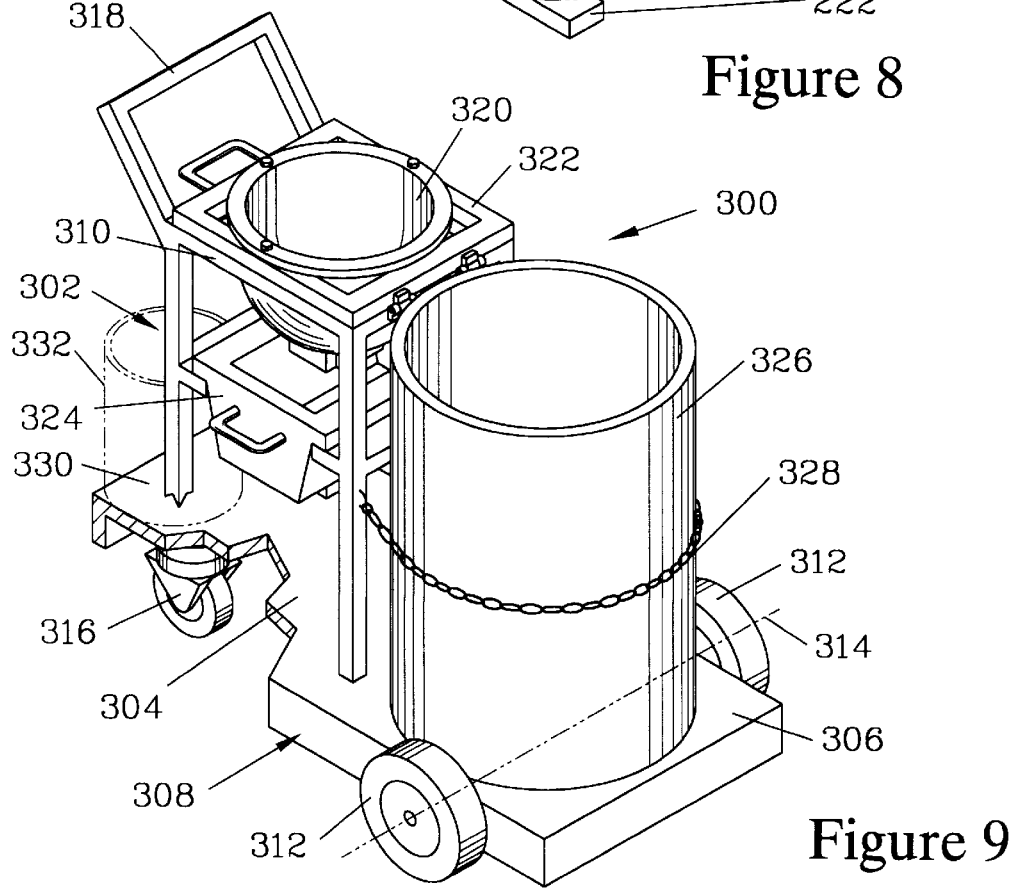
FIG. 9 illustrates another embodiment of the present invention which has three wheels. A base and a protrusion of this embodiment form an integrated load platform, and the paired wheels have an axis which resides under the drum. A steering wheel is positioned at a distance from the axis of the paired wheels, and the handle is located in close proximity to the steering wheel to facilitate maneuvering the dross processing system.

FIG. 9 Illustrates a dross processing system 300 which forms another embodiment of the present invention. The dross processing system 300 is a three-wheeled system, which provides greater mobility when heavily loaded with spent dross.

The dross processing system 300 has a support frame 302 having a base 304 and a protrusion 306 which are integrated to form a load platform 308. The support frame 302 has an upper support 310, and has a pair of wheels 312 which are mounted to the load platform 308. The pair of wheels 312 have a common paired wheel axis 314.

A steering wheel 316 is pivotably mounted to the load platform 308 at a position distant from the paired wheel axis 314 of the pair of wheels 312. A handle 318 is attached to the support frame 302, and is positioned substantially above the steering wheel 316. The position of the handle 318 allows a user to exert a torque on the load platform 308 to turn the pivotably mounted steering wheel 316, allowing the user to move the dross processing system 300 in a desired direction.

Similar to the embodiments discussed above, the dross processing system 300 has a dross-receiving crucible 320 mounted to a pivotable crucible frame 322, a metal collection pan 324, and a spent dross drum 326. The spent dross drum 326 in this embodiment is positioned on the load platform 308 substantially above paired wheel axis 314, allowing the pair of wheels 312 to support the weight of the spent dross drum 326. Since the user does not have to tilt the support frame 302 to move the dross processing system 300, movement when the spent dross drum 326 is heavily loaded with spent dross is greatly facilitated. Means for maintaining the spent dross drum 326 engaged with the support frame 302 are provided by a chain 328.

The load platform 308 also provides a storage shelf 330. The storage shelf 330 is formed by an extension of the load platform 308, and is sized to accept a flux container 332. The flux container 332 is typically a resealable container, such as a plastic pail with a lid. The flux container 332 may be conveniently placed on the storage shelf 330, and is thus kept available to the user of the dross processing system 300 as the dross processing system 300 is moved from one furnace site to another.

Figure 10:
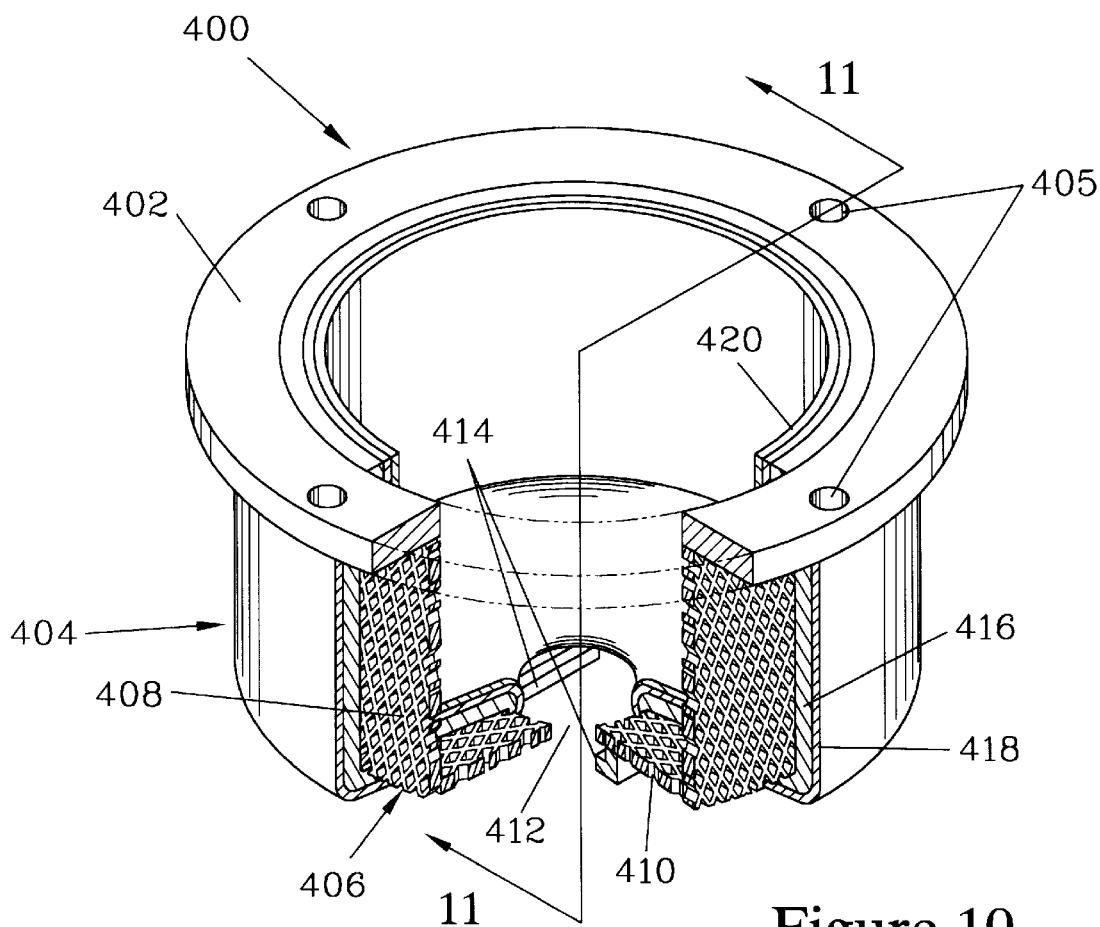
FIG. 10 is a cutaway view illustrating a preferred embodiment of the dross receiving crucible. The dross receiving crucible is formed from a metal mounting rim, to which is attached a framework formed of an expanded metal mesh to form a reservoir. A pair of channels are welded to the framework, and the framework is covered with refractory material, producing a layered structure. The thickness of the layers is exaggerated for purposes of illustration.

FIG. 10 illustrates a preferred structure for a dross receiving crucible 400 which is suitable for employment in the dross processing systems discussed above. The dross receiving crucible 400 features a structure which provides low thermal conductivity, to minimize quenching of exothermic reactions and possible freezing of the metal, while still providing high physical strength.

The dross receiving crucible 400 is fabricated with a mounting rim 402 and a reservoir 404. The mounting rim 402 is constructed of metal, and provides a rigid member for attaching the crucible 400 to a crucible frame such as the crucible frames (32, 112, 212, and 322) discussed above. Typically the mounting rim 402 is mounted to the crucible frame with bolts which pass through bolt holes 405 in the mounting rim 402.

A reservoir form 406 is formed of a metal mesh, such as a sheet of expanded metal. The reservoir form 406 is attached to the mounting rim 402 to provide the underlying structure which, when refractory materials are applied thereto, forms the reservoir 404. The reservoir 404 is formed with an upper substantially vertical sidewall 408 terminating at the mounting rim 402, and a graded bottom 410 having a crucible port 412. The mounting rim 402 and the reservoir form 406, with its accompanying refractory materials, provide sufficient strength to the dross receiving crucible 400 to withstand the physical stresses of the mixing and dumping procedures to which it is subjected in use.

A pair of L-shaped metal channels 414 are attached to the bottom 410 of the reservoir form 406 on either side of the crucible port 412. Preferably, the channels 414 are formed by bending steel strip of 15–20 gauge, and the channels 414 are attached to the reservoir form 406 by welding.

Figure 11:
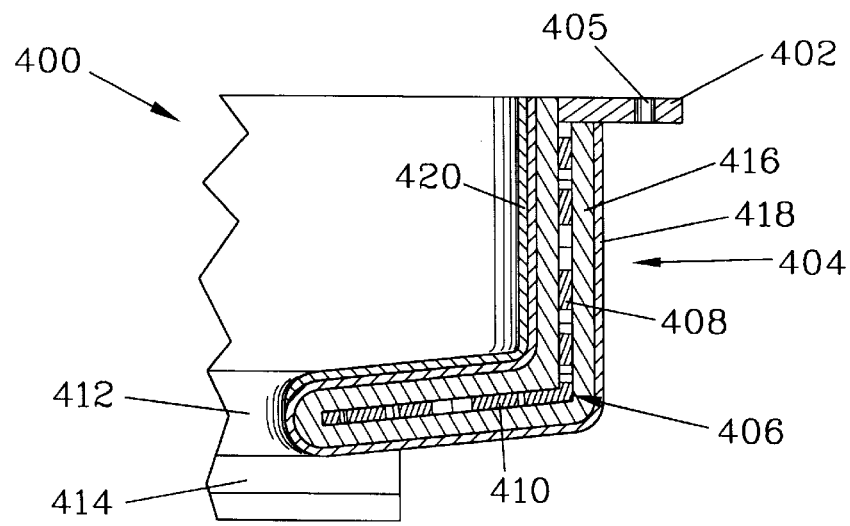
FIG. 11 is a detail view showing the section 11—11 of FIG. 10 and illustrating further details of the layered construction of the crucible.

FIG. 11 is a detail view of the section 11—11 of FIG. 10, showing details of the applied refractory materials and the layered construction of the crucible 400. It should be noted that the views of FIGS. 10 and 11 are not to scale, and the thicknesses of the layers is exaggerated for purposes of illustration. The reservoir form 406 is covered on both sides by a moldable refractory cloth 416. Such molded refractory cloth 416 is commercially available, one example being type "DM" refractory sheet by Zircar Products, Inc. A thickness of about $5/16$ inch on the inside surfaces of the crucible 400 has been found to be an effective thickness for the moldable refractory cloth 416. A refractory wash 418 is applied over the refractory cloth 416. Again, such refractory washes are commercially available, such as refractory washes available from ZYP Coatings, Inc. or LaFrance Mfg. Co., and such are commonly used for washing pouring ladles. It has been found effective for the refractory wash 418 to be applied with a thickness of between about $1/64$ inch and $1/16$ inch. Preferably, a finishing wash 420 such as a boron nitride bearing wash is then applied to the interior surfaces of the reservoir 404 to reduce sticking of the dross to the dross receiving crucible 400. Lubricoat®—BNW by ZYP Coatings, Inc. is one boron nitride containing wash which is suitable for use as the final wash 420.

The practice of the method which employs the equipment of the present invention depends, in part, on the quantity of dross that resides on the surface of the molten metal bath in the furnace. When the volume of dross is small, the dross is preferably preheated while still in the furnace by the addition of an exothermic compound to the dross. After the exothermic compound is added to preheat the dross, the preheated dross is ladled into a dross receiving crucible as described above, while it is in the dross loading position.

In larger furnaces such as reverberatory furnaces which generate larger volumes of dross, the dross can be transferred without substantial heat loss and preheating exothermic compounds are not added to the dross prior to transfer to the dross receiving crucible.

In either case, the dross is skimmed from the surface of the metal bath and is loaded into the dross receiving crucible having a bottom port. The bottom port is sealed with a removable plug. After the dross is placed in the crucible, the dross is mixed with an exothermic compound to raise its temperature and promote coalescence of the liquid metal dispersed through the dross. To mix the dross with the exothermic flux, it is preferred to manually stir the exothermic flux into the dross.

When manual stirring is performed to aid in mixing, it is preferred to stir using a stirring rod of low thermal conductivity or, alternatively, use the skimmer as a stirring rod, the skimmer being preheated by its use to skim the molten metal.

It is further preferred to employ a reducing flux with the exothermic flux, adding both to the dross in the dross reducing crucible. The reducing flux aids in the break-down of the oxide coating on the metal droplets and promotes coalescence of the droplets. Preferably, these reducing fluxes have fluoride compounds therein, and it is felt that silica fluorides, calcium fluorides, and sodium fluorides are particularly effective.

Preferred reducing fluxes for promoting coalescence of the entrapped metal and reducing the dross include fluoride compounds such as NaF, KF, CaF, $Na_3AlF_6$, $Na_2SiF_6$, and $NaAlF_4$. Two commercially available reducing fluxes are Asbury 711 and American Colloid's product Reel Kleen® Al-510. The latter of these has been found to be more effective than the former.

The mixing, whether with or without reducing fluxes, tends to promote coalescence of the entrapped metal and formation of a molten pool of metal in the lower region of the crucible as the entrapped metal percolates through the dross, leaving behind a granular spent dross. The metal is somewhat cleansed by percolating through the dross, being largely free of oxides. It should be noted that the pooled metal forms an insulating layer which helps protect the bottom of the crucible from attack by the exothermic flux and the dross.

When the entrapped metal percolates through the oxides and other foreign material which form the dross and a molten pool of metal is formed, the plug is removed and the metal is drained into a metal collection vessel. The spent dross is then dumped into a spent dross receptacle.

While the novel features of the present invention have been described in terms of particular embodiments and preferred applications, it should be appreciated by one skilled in the art that substitution of materials and modification of details obviously can be made without departing from the spirit of the invention.

What I claim is:

1. A dross reduction processing system for separating metal from dross to provide metal for remelting and spent dross for disposal, the dross processing system comprising:
    a support frame having,
        a base, and
        an upper support spaced apart from said base;
    a pair of wheels which are rotatably mounted to said support frame in the vicinity of said base;
    a dross-receiving crucible having,
        an upper region with a substantially vertical sidewall, and
        a lower region terminating in a sloped bottom wall having a port therein;
    a crucible frame to which said crucible is mounted, said crucible frame being pivotably mounted to said upper support to allow pivoting said crucible between a dross loading position and a spent dross removal position; and
    means for opening and closing said port.

2. The dross processing system of claim 1 further comprising:
    a metal collection pan which is positioned relative to said crucible frame to accept metal passing through said port when said crucible is in said dross loading position.

3. The dross processing system of claim 2 further comprising:
    a handle which is affixed to said support frame.

4. The dross processing system of claim 3 wherein the spent dross is stored in a spent dross container, said support frame further comprising:
    means for indexing the spent dross container with respect to said support frame such that the spent dross falls into the spent dross container when said crucible is in said spent dross removal position.

5. The dross processing system of claim 4 wherein the spent dross container has a container rim and wherein said means for indexing the spent dross container with respect to said support frame further comprises:
    a chute which is pivotably mounted with respect to said support frame so as to be engagable with the container rim, said chute being positioned with respect to said support frame as to catch the spent dross when said crucible is in said spent dross removal position and direct the spent dross into the dross container.

6. The dross processing system of claim 4 wherein the spent dross container is a drum, further wherein said means for indexing the spent dross container with respect to said support frame further comprises:
    at least one protrusion attached to said base.

7. The dross processing system of claim 6 wherein said metal collection pan resides in said support frame and said crucible resides above said support frame when said crucible is in said dross loading position, said support frame further comprising:
    means for maintaining the drum engaged with said support frame.

8. The dross processing system of claim 7 wherein said base and said protrusion are formed as an integrated load platform, the dross processing system further comprising:
    a steering wheel pivotably and rotatably mounted with respect to said integrated load platform and spaced apart from said pair of wheels.

9. The dross processing system of claim 1 wherein said means for opening and closing said port further comprise:

a pair of L-shaped channels affixed to said lower region of said crucible and positioned parallel to each other on opposite sides of said port;

a closure plate slidably engaging said pair of L-shaped channels so as to be slidable to a port closed position, where said closure plate blocks said port; and a port plug which slidably engages said port and is supported on said closure plate when said closure plate is in said port closed position.

10. The dross processing system of claim 9 wherein said closure plate further comprises:

an aperture, said closure plate being movable between said port closed position and a port open position where said aperture is substantially aligned with said port;

a port open stop which engages said pair of L-shaped channels when said closure plate is in said port open position; and a port closed stop which engages said pair of L-shaped channels when said closure plate is in said port closed position.

11. The dross processing system of claim 4 wherein the spent dross container is a drum, further wherein said means for indexing the spent dross container further comprises:

a load platform formed integrally with said base for supporting the drum, said pair of wheels being rotatably mounted to said load platform along a common paired wheel axis;

the dross processing system further comprising:

a steering wheel pivotably and rotatably attached to said load platform at a location spaced apart from said paired wheel axis and substantially below said handle.

12. The dross processing system of claim 11 further comprising:

a storage shelf on said load platform for supporting a container of flux compound.

13. The dross processing system of claim 1 wherein said crucible further comprises:

a metal mounting rim which terminates said upper region of said crucible, said mounting rim serving to mount said crucible to said crucible frame;

a reservoir form of metal mesh attached to said mounting rim, said reservoir form being shaped to define said upper region and said lower region of said crucible;

a moldable refractory cloth applied over said reservoir form; and a ceramic wash applied over said moldable refractory cloth.

14. The dross processing system of claim 13 further comprising:

a finishing wash applied to an inner side of said crucible over said refractory wash.

15. A crucible for receiving and holding metal dross skimmed from a metal bath in a dross processing system, the crucible comprising:

a metal mounting rim for mounting the crucible to the dross processing system;

a reservoir form of metal mesh attached to said mounting rim, said reservoir form being shaped to define an upper region with a substantially vertical sidewall and a lower region terminating in a sloped bottom wall having a port therein;

a moldable refractory cloth applied over said reservoir form;

a ceramic wash applied over said moldable refractory cloth; and means for opening and closing said port.

16. The crucible of claim 15 further comprising:

a finishing wash applied to an inner side of the crucible over said refractory wash.

* * * * *